United States Patent
Yesumali et al.

(10) Patent No.: US 11,293,323 B2
(45) Date of Patent: Apr. 5, 2022

(54) SYSTEMS AND METHODS FOR REDUCTANT DELIVERY IN AFTERTREATMENT SYSTEMS FOR INTERNAL COMBUSTION ENGINES

(71) Applicant: CUMMINS EMISSION SOLUTIONS INC., Columbus, IN (US)

(72) Inventors: Snehal Shivaji Yesumali, Miraj (IN); Colin L. Norris, Columbus, IN (US); Ronald Hale, Columbus, IN (US); Ken Hummel, Barneveld, WI (US); Tyler Kent Lorenz, McFarland, WI (US); Raghunath Thakar, Dombivli West (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 17/070,513

(22) Filed: Oct. 14, 2020

(65) Prior Publication Data
US 2021/0025308 A1 Jan. 28, 2021

Related U.S. Application Data

(63) Continuation of application No. 16/144,683, filed on Sep. 27, 2018, now Pat. No. 10,837,339.

(51) Int. Cl.
*F01N 13/00* (2010.01)
*F01N 3/20* (2006.01)

(52) U.S. Cl.
CPC ............ *F01N 3/2066* (2013.01); *F01N 3/208* (2013.01); *F01N 3/2046* (2013.01); *F01N 13/009* (2014.06); *F01N 2560/06* (2013.01); *F01N 2570/14* (2013.01); *F01N 2610/02* (2013.01); *F01N 2610/08* (2013.01); *F01N 2610/14* (2013.01); *F01N 2610/1453* (2013.01)

(58) Field of Classification Search
CPC ...... F01N 3/029; F01N 3/0293; F01N 3/2066; F01N 2610/02; F01N 2610/11; F01N 2610/14; F01N 2610/1453
See application file for complete search history.

(56) References Cited

U.S. PATENT DOCUMENTS

2013/0152555 A1* 6/2013 Bui ................. F01N 3/2892
60/295

FOREIGN PATENT DOCUMENTS

DE 102005030954 A1 * 1/2007 ............. F16L 53/37
DE 102006053558 A1 * 5/2008 ........... F01N 3/2066
(Continued)

OTHER PUBLICATIONS

Machine translation of EP 3181847 A1, accessed Apr. 9, 2020. (Year: 2020).*
(Continued)

*Primary Examiner* — Jonathan R Matthias
(74) *Attorney, Agent, or Firm* — Foley & Lardner LLP

(57) ABSTRACT

A dosing lance assembly for an exhaust component includes: a housing comprising: a plate having a first channel, an endcap having a second channel, and a pipe having a first end coupled to the plate and a second end coupled to the endcap, wherein at least a portion of the pipe is airfoil-shaped; and a delivery conduit having a first end coupled to the plate and a second end coupled to the endcap, such that reductant is flowable from the first channel to the second channel.

24 Claims, 14 Drawing Sheets

(56) References Cited

FOREIGN PATENT DOCUMENTS

DE      102009029661 A1 *   3/2011   ........... F01N 3/2066
EP          3 181 847           6/2017
WO    WO-2020/014564         1/2020

OTHER PUBLICATIONS

Combined Search and Examination Report issued for GB 1913363.6 dated Feb. 17, 2020, 6 pages.
Search Report issue for UK Patent Application No. GB 2019534.3, dated Mar. 11, 2021, 4 pages.

* cited by examiner

SYSTEMS AND METHODS FOR REDUCTANT DELIVERY IN AFTERTREATMENT SYSTEMS FOR INTERNAL COMBUSTION ENGINES

CROSS-REFERENCE TO RELATED APPLICATION

The present application is a continuation of U.S. patent application Ser. No. 16/144,683, filed Sep. 27, 2018. The contents of this application are hereby incorporated by reference in their entirety.

TECHNICAL FIELD

The present application relates generally to systems and methods for reductant delivery in aftertreatment systems for internal combustion engines.

BACKGROUND

For internal combustion engines, such as diesel engines, nitrogen oxide ($NO_x$) compounds may be emitted in the engine exhaust. To reduce $NO_x$ emissions, a reductant may be dosed into the exhaust by a dosing system. The dosing system may include a housing positioned within an exhaust stream and a pipe positioned within the housing.

SUMMARY

In the above-described systems, the reductant may be provided through the pipe such that the pipe is substantially maintained at the temperature of the reductant. As the exhaust stream flows over the housing, the temperature of the housing increases while the temperature of the pipe is substantially maintained at the temperature of the reductant. As a result, a temperature gradient is created at junctures between the pipe and the housing. Stresses accumulate at the junctures due to the temperature gradient. These stresses can lead to failure of the dosing system. Accordingly, it is desirable to mitigate the accumulation of stresses at junctures between a housing and a pipe in a dosing system.

In one embodiment, a dosing lance assembly for an exhaust component includes a housing and a delivery conduit. The housing includes a plate, an endcap, and a pipe. The plate has a first channel. The endcap has a second channel. The pipe has a first end coupled to the plate and a second end coupled to the endcap. The delivery conduit has a first end coupled to the plate and a second end coupled to the endcap, such that reductant is flowable from the first channel to the second channel. When the housing is at an ambient temperature, (i) a length of the delivery conduit measured along the delivery conduit between a location at which the first end of the delivery conduit is coupled to the plate and a location at which the second end of the delivery conduit is coupled to the endcap is greater than (ii) a first distance between a location at which the first end of the pipe is coupled to the plate and a location at which the second end of the pipe is coupled to the endcap.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
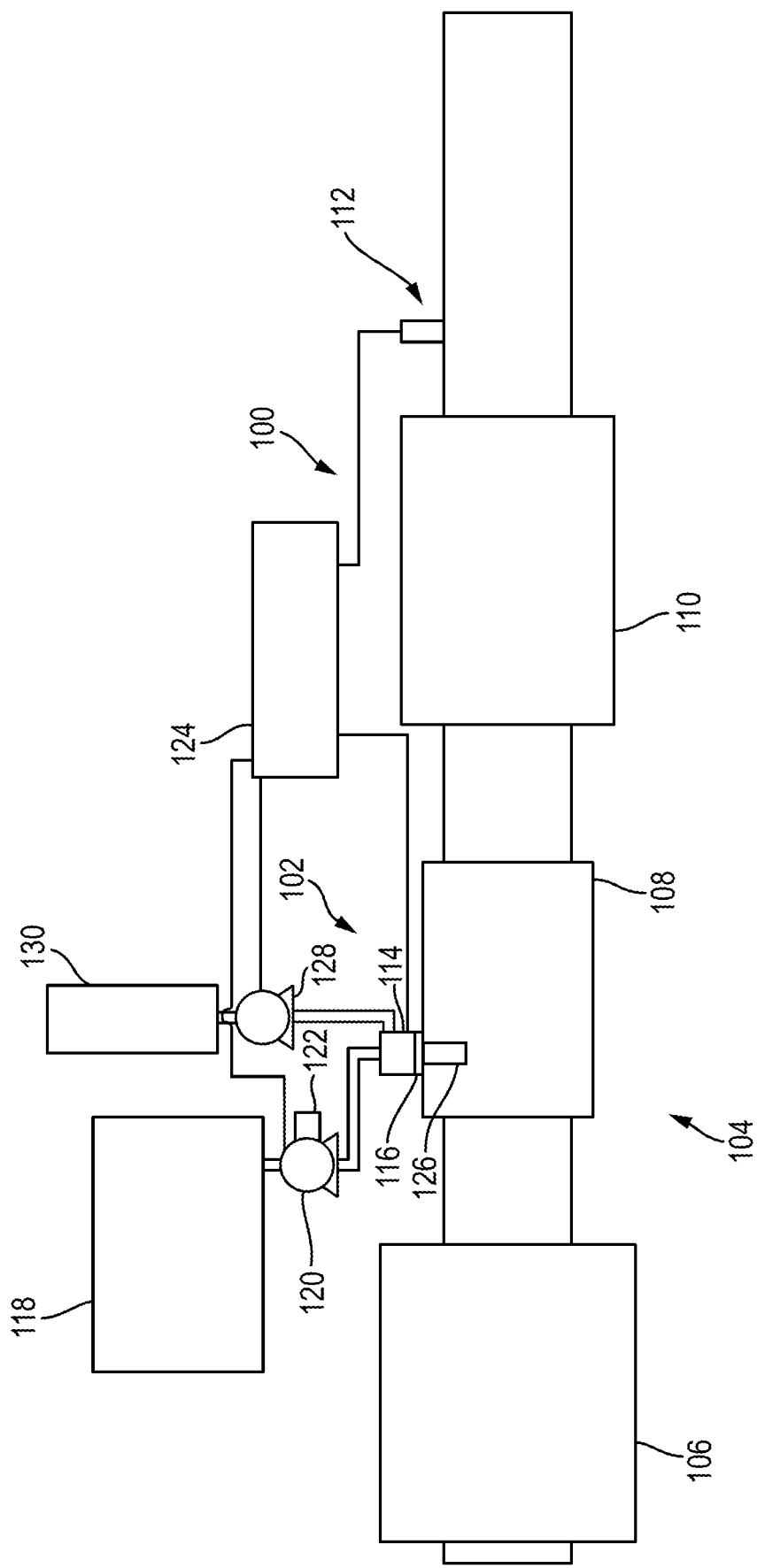
FIG. 1 is a block schematic diagram of an example aftertreatment system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for delivering reductant through conduits within an aftertreatment system of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a doser within an aftertreatment system. Dosers typically treat exhaust gases using a reductant. The reductant is typically provided from the doser into a dosing lance which distributes (e.g., doses, etc.) the reductant into an exhaust stream within an exhaust component.

Dosing lances are exposed to exhaust gases which cause heating of the dosing lances. This heating is distributed to components of the dosing lances. Reductant is provided through the dosing lances and cools components of the dosing lances. As a result, thermal gradients may exist between components that are cooled by the reductant and other components that are heated by the exhaust gases A dosing lances may include a delivery conduit which is attached to the dosing lance and within which the reductant is provided. While the delivery conduit is cooled by the reductant, it is simultaneously heated by the exhaust gases. Thermal gradients at various locations, such as attachment points between the delivery conduit and the dosing lance, may become structurally compromised due to the accumulation of thermal stresses. These thermal gradients may be particularly pronounced in, for example, high horsepower applications. Accordingly, it is desirable to mitigate the accumulation of thermal stresses in delivery conduits in order to maintain the structural integrity of the dosing lance and delivery conduit.

Implementations described herein relate to a dosing lance assembly which includes a helical dosing conduit that facilitates expansion and contraction of components of the dosing lance assembly due to heat provided by exhaust gases. The helical dosing conduit has a length along the helical dosing conduit that is greater than a distance between locations where the helical dosing conduit is attached to the dosing lance assembly. As the dosing lance assembly is heated, the helical dosing conduit is straightened. Similarly, the helical dosing conduit becomes increasingly helical as the dosing lance assembly is cooled. In this way, the helical dosing conduit mitigates the accumulation of thermal stresses at attachment points of the helical dosing conduit to the dosing lance assembly.

II. Overview of Aftertreatment System

FIG. 1 depicts an aftertreatment system 100 having an example reductant delivery system 102 for an exhaust system 104. The aftertreatment system 100 includes a particulate filter (e.g., a diesel particulate filter (DPF) 106), the reductant delivery system 102, a decomposition chamber 108 (e.g., reactor, reactor pipe, etc.), a SCR catalyst 110, and a sensor 112.

The DPF 106 is configured to (e.g., structured to, able to, etc.) remove particulate matter, such as soot, from exhaust gas flowing in the exhaust system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, an urea water solution (UWS), an aqueous urea solution (e.g., AUS32, AUS 40, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly communicable with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a filter 122. The filter 122 filters (e.g., strains, etc.) the reductant prior to the reductant being provided to internal components (e.g., pistons, vanes, etc.) of the reductant pump 120. For example, the filter 122 may inhibit or prevent the transmission of solids (e.g., solidified reductant, contaminants, etc.) to the internal components of the reductant pump 120. In this way, the filter 122 may facilitate prolonged desirable operation of the reductant pump 120. In some embodiments, the reductant pump 120 is coupled to a chassis of a vehicle associated with the aftertreatment system 100.

The dosing module 114 and reductant pump 120 are also electrically or communicatively coupled to a controller 124. The controller 124 is configured to control the dosing module 114 to dose the reductant into the decomposition chamber 108. The controller 124 may also be configured to control the reductant pump 120. The controller 124 may include a microprocessor, an application-specific integrated circuit (ASIC), a field-programmable gate array (FPGA), etc., or combinations thereof. The controller 124 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 124 can read instructions. The instructions may include code from any suitable programming language.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust system 104.

The exhaust system 104 may further include an oxidation catalyst (e.g., a diesel oxidation catalyst (DOC)) in fluid communication with the exhaust system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger, upstream of a turbocharger, or integrated within the turbocharger.

The sensor 112 may be coupled to the exhaust system 104 to detect a condition of the exhaust gas flowing through the exhaust system 104. In some implementations, the sensor 112 may have a portion disposed within the exhaust system 104; for example, a tip of the sensor 112 may extend into a portion of the exhaust system 104. In other implementations, the sensor 112 may receive exhaust gas through another conduit, such as one or more sample pipes extending from the exhaust system 104. While the sensor 112 is depicted as positioned downstream of the SCR catalyst 110, it should be understood that the sensor 112 may be positioned at any other position of the exhaust system 104, including upstream of the DPF 106, within the DPF 106, between the DPF 106 and the decomposition chamber 108, within the decomposition chamber 108, between the decomposition chamber 108 and the SCR catalyst 110, within the SCR catalyst 110, or downstream of the SCR catalyst 110. In addition, two or more sensors 112 may be utilized for detecting a condition of the exhaust gas, such as two, three, four, five, or six sensors 112 with each sensor 112 located at one of the aforementioned positions of the exhaust system 104.

The dosing module 114 includes a dosing lance assembly 126. The dosing lance assembly 126 includes a delivery conduit (e.g., delivery pipe, delivery hose, etc.). The delivery conduit is fluidly coupled to the reductant pump 120 and a nozzle (e.g., for dosing into the decomposition chamber 108, etc.). At least a portion of the dosing lance assembly 126 is located proximate (e.g., close, adjacent, etc.) to the exhaust system 104. When the aftertreatment system 100 is operating and exhaust is provided to the aftertreatment system 100, the temperature of components of the exhaust system 104 may rise (e.g., due to hot exhaust gases within the exhaust system, etc.). Heat from the exhaust system 104 may cause a temperature increase of the dosing lance assembly 126. When exhaust is no longer provided to the exhaust system 104 (e.g., such as after an internal combustion engine associated with the aftertreatment system 100 has been turned off, etc.), the temperature of the dosing lance assembly 126 may decrease. As the temperature of the dosing lance assembly 126 changes, stresses (e.g., thermal stresses, etc.) may accumulate (e.g., accrue, collect, etc.) in the dosing lance assembly 126. As will be explained in more detail herein, the delivery conduit of the dosing lance assembly 126 is configured to selectively deform to mitigate the accumulation of stresses in the dosing lance assembly 126.

The reductant delivery system 102 also includes an air pump 128. The air pump 128 draws air from an air source 130 (e.g., air intake, etc.). Additionally, the air pump 128 provides the air to the dosing module 114 via a conduit. The dosing module 114 is configured to mix the air and the reductant into an air-reductant mixture. The dosing module 114 is further configured to provide the air-reductant mixture into the decomposition chamber 108.

III. Example Aftertreatment System Including an Auxiliary Delivery Conduit

Figure 2:
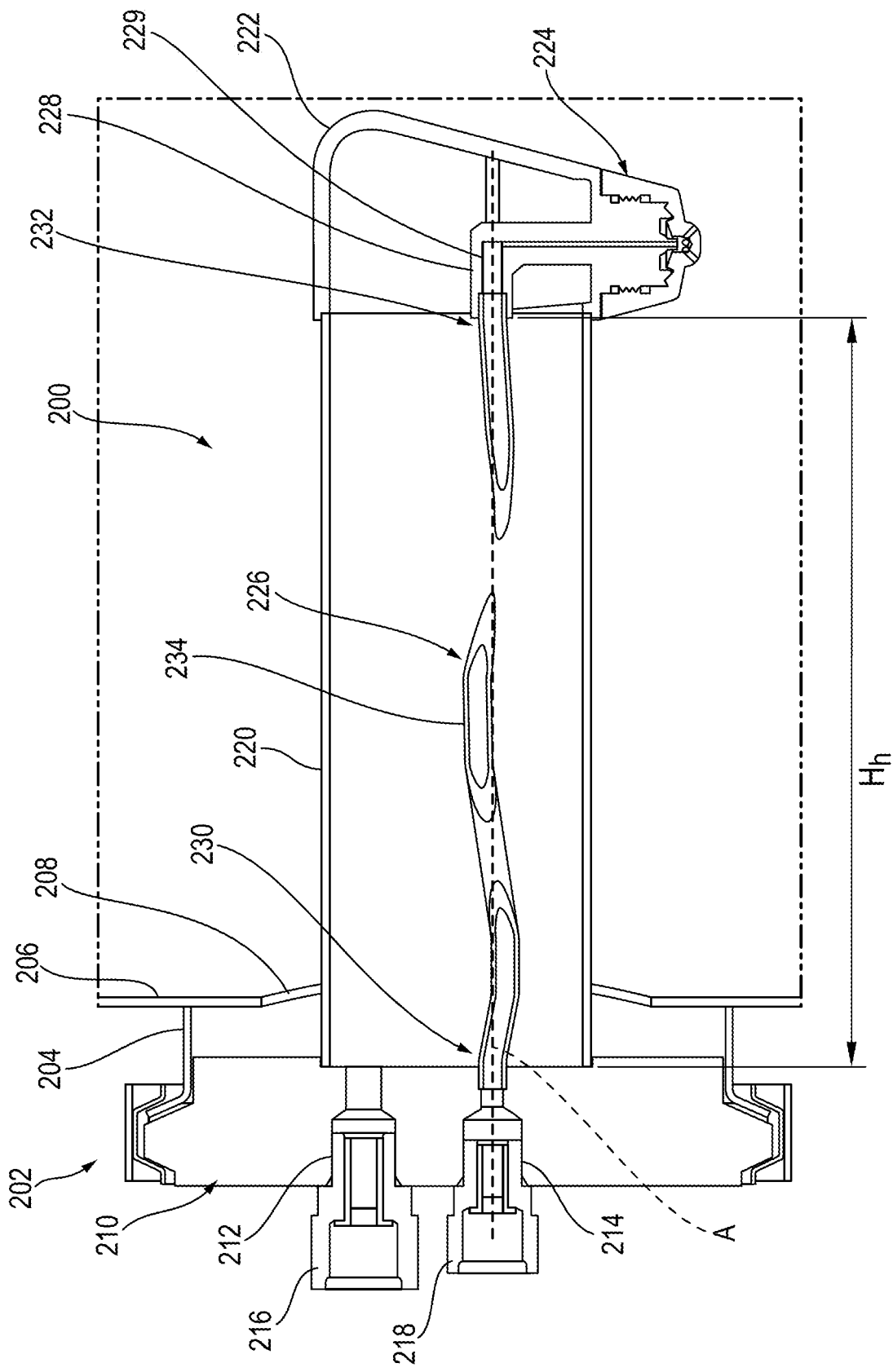
FIG. 2 is a cross-sectional view of an example dosing lance assembly for use in an aftertreatment system, such as the example aftertreatment system shown in FIG. 1.

FIG. 2 illustrates a cross-sectional view of an example dosing lance assembly 200. The dosing lance assembly 200 may function as the dosing lance assembly 126 previously described. The dosing lance assembly 200 includes a housing 202. The housing 202 includes a coupler 204 that is configured to be coupled (e.g., attached, affixed, fastened, welded, riveted, etc.) to an exhaust component 206. In some embodiments, the exhaust component 206 is the decomposition chamber 108 previously described. In other embodiments, the exhaust component 206 is an exhaust conduit (e.g., tailpipe, manifold, etc.). The coupler 204 is disposed over an aperture 208 (e.g., hole, opening, etc.) in the exhaust component 206.

The housing 202 also includes a plate 210 (e.g., endplate, endcap, etc.). The plate 210 is coupled to the coupler 204. The plate 210 includes a first channel 212 (e.g., passageway, passage, etc.) and a second channel 214 (e.g., passageway, passage, etc.). The first channel 212 receives a first connector 216, and the second channel 214 receives a second connector 218. The first connector 216 receives air (e.g., from the air pump 128, etc.) and provides the air through the plate 210 via the first channel 212. Similarly, the second connector 218 receives reductant (e.g., from the reductant pump 120, etc.) and provides the reductant through the plate 210 via the second channel 214.

The housing 202 also includes a pipe 220 (e.g., airfoil pipe, pipe, cover, etc.). The pipe 220 has a first end that is coupled to the plate 210 over the first channel 212 and the second channel 214. The pipe 220 extends through the coupler 204 and the aperture 208, and into the exhaust component 206. The housing 202 also includes an endcap 222. The pipe 220 also has a second end that is coupled to the endcap 222. In some embodiments, the endcap 222 extends substantially orthogonally from the pipe 220. The housing 202 also includes a nozzle 224 positioned within the endcap 222. The nozzle 224 is configured to provide an air-reductant mixture into the exhaust component 206.

The dosing lance assembly 200 also includes a delivery conduit 226. The delivery conduit 226 is coupled to the second channel 214. The delivery conduit 226 extends through the pipe 220 and is coupled to a fitting 228 on the nozzle 224. Specifically, the delivery conduit 226 is received within a channel 229 in the endcap 222 extending through the nozzle 224 and the fitting 228. The delivery conduit 226 is configured to receive the reductant from the second connector 218 and to provide the reductant to the nozzle 224.

The delivery conduit 226 includes a first end 230 and a second end 232. The first end 230 is coupled to the plate 220 and the second end 232 is coupled to the endcap 222. In various embodiments, the first end 230 is coupled to the second channel 214 and the second end 232 is coupled to the channel 229. The delivery conduit 226 also includes a center section 234 contiguous with the first end 230 and the second end 232. The delivery conduit 226 is rotatably disposed about (e.g., revolved around, etc.) or bent (e.g., turned, twisted, etc.), in a single bend or in multiple bends, relative to a channel central axis A upon which the second channel 214 is centered on. The center section 234 is bent in a single bend, multiple bends, or a single helix about the channel central axis A of the second channel 214. As will be described in more detail herein, the center section 234 is configured to selectively extend and contract to mitigate the accumulation of stresses in the first end 230, the second end 232, and/or the housing 202.

The dosing lance assembly 200 is associated with an internal combustion engine. The internal combustion engine is operable between a powered (e.g., on, operational, etc.) state and a non-powered (e.g., off, non-operational, etc.) state. In the powered state, the internal combustion engine produces exhaust gases that are provided through the exhaust component 206. The exhaust gases are hot and transfer heat to the housing 202, which further transfers heat to the delivery conduit 226.

The temperature of the housing 202 varies depending upon the state of the internal combustion engine associated with the dosing lance assembly 200. The temperature of the housing 202 may be an ambient temperature $T_O$ associated with an ambient environment surrounding the dosing lance assembly 200 when the internal combustion engine is in the non-powered state and has substantially cooled down. The ambient temperature $T_O$ is the temperature of the dosing lance assembly 200 absent any heating and/or cooling provided by the internal combustion engine associated with the dosing lance assembly 200. The ambient temperature $T_O$ may be the temperature of air surrounding the dosing lance assembly 200. In various applications, the ambient temperature $T_O$ may be, for example, between negative fifty-five degrees Celsius and fifty degrees Celsius, inclusive. The center section 234 is bent relative to the channel central axis A of the second channel 214 when the temperature of the housing 202 is the ambient temperature $T_O$.

The temperature of the housing 202 may be a steady-state temperature $T_{SS}$ when the internal combustion engine is in the powered state and has sufficiently warmed up. In various applications, the steady-state temperature $T_{SS}$ may be, for example, between two-hundred degrees Celsius and five-hundred degrees Celsius, inclusive. In other applications, the steady-state temperature $T_{SS}$ may be, for example, between two-hundred degrees Celsius and five-hundred and fifty degrees Celsius, inclusive. The center section 234 may be bent relative to the channel central axis A of the second channel 214 when the temperature of the housing 202 is the steady-state temperature $T_{SS}$. The center section 234 may be at least partially disposed along the channel central axis A of the second channel 214 when the temperature of the housing 202 is the steady-state temperature $T_{SS}$.

The temperature of the housing 202 may be a warm up temperature $T_{WU}$ when the internal combustion engine is in the powered state but the temperature of the housing 202 is less than the steady-state temperature $T_{SS}$. In various applications, the warm up temperature $T_{WU}$ may be, for example, between negative fifty-five degrees Celsius and five-hundred degrees Celsius, inclusive. The center section 234 may be bent relative to the channel central axis A of the second channel 214 when the temperature of the housing 202 is the warm up temperature $T_{WU}$. The center section 234 may be at least partially disposed along the channel central axis A of the second channel 214 when the temperature of the housing 202 is the warm up temperature $T_{WU}$.

The temperature of the housing 202 may also be a cool down temperature $T_{CD}$ when the internal combustion engine is in the non-powered state but the temperature of the housing 202 is less than the steady-state temperature $T_{SS}$. In various applications, the cool down temperature $T_{CD}$ may be, for example, between negative fifty-five degrees Celsius and five-hundred degrees Celsius, inclusive. The center section 234 may be bent relative to the channel central axis A of the second channel 214 when the temperature of the housing 202 is the cool down temperature $T_{CD}$. The center section 234 may be at least partially disposed along the channel central axis A of the second channel 214 when the temperature of the housing 202 is the cool down temperature $T_{CD}$.

TABLE 1

Comparison of the state of the internal combustion engine and temperature of the housing 202.

| State of Internal Combustion Engine | Temperature of the Housing 202 | Example Temperatures of the Housing 202 [° C.] |
|---|---|---|
| Non-Powered | $T_O$ | $-55 \leq T_O \leq 50$ |
| Powered - Warm Up | $T_O < T_{WU} < T_{SS}$ | $-55 \leq T_{WU} \leq 500$ |
| Powered - Steady-State | $T_{SS}$ | $200 \leq T_{SS} \leq 500$ |
| Non-Powered - Cool Down | $T_O < T_{CD} < T_{SS}$ | $-55 \leq T_{CD} \leq 500$ |

The center section 234 completes a cycle (e.g., thermal cycle, etc.) when the temperature of the housing 202 starts at the ambient temperature $T_O$, attains the steady state-temperature $T_{SS}$, and returns back to the ambient temperature $T_O$. As the temperature of the housing 202 changes, the center section 234 is configured to deform (e.g., rotate, translate, straighten, bend, expand, contract, etc.) relative to the channel central axis A of the second channel 214. The ability of the center section 234 to deform is facilitated by the bent nature of the center section 234 when the delivery conduit 226 is at the ambient temperature $T_O$. Deformation of the center section 234 mitigates accumulation of stresses (e.g., thermal stresses, etc.) in the first end 230, the second end 232, and/or the housing 202 that occur due to the change in temperature of the housing 202. By mitigating the accumulation of stresses, the dosing lance assembly 200 is capable of withstanding a relatively large number of cycles of the center section 234.

In contrast to the dosing lance assembly 200, many conventional dosing lances include pipes for carrying reductant that are substantially straight at an ambient temperature. When a straight pipe is heated by exhaust gases, stresses accumulate in the straight pipe (e.g., at ends of the pipe, at attachment points of the pipe, etc.) because the straight pipe does not include any mechanism for effectively mitigating the accumulation of stresses. Accordingly, straight pipes are unable to withstand a relatively large number of cycles and may, for example, begin to crack and leak reductant. As a result, many conventional dosing lances are considerably less desirably than the dosing lance assembly 200.

The delivery conduit 226 is substantially rigid. By "substantially rigid," it is meant that the delivery conduit 226 maintains its shape even when not supported at both ends. The delivery conduit 226 is made of a substantially non-elastic material. The delivery conduit 226 may deform under pressure, but does so substantially without stretching of the material of the delivery conduit 226. For example, the delivery conduit 226 may be made of solid metal.

In various embodiments, the housing 202, the pipe 220, the endcap 222, and/or the nozzle 224 are made from a ferritic steel (e.g., 439, 409, 410L, 430, 430Ti, 439, 441, 434, 436, 444, 446, 445, 447, etc.) and the delivery conduit 226 is constructed from an austenitic steel (e.g., 304, 304L, 309, 310, 318, 316, 316L, 316Ti, 321, 200, etc.). Such construction of the housing 202, the pipe 220, the endcap 222, and/or the nozzle 224 may minimize cost of the dosing lance assembly 200 while mitigating corrosion of the delivery conduit 226. In an example embodiment, the pipe 220 is constructed from 439 stainless steel and the delivery conduit 226 is constructed from 316 stainless steel. However, the housing 202, the pipe 220, the endcap 222, the nozzle 224, and/or the delivery conduit 226 may be constructed from, for example, aluminum, titanium, bronze, and other similar materials. In various embodiments, the delivery conduit 226 is not constructed from a non-metallic material (e.g., rubber, elastomer, etc.).

In various embodiments, the delivery conduit 226 is a one-piece construction (e.g., is not comprised of a plurality of components joined or coupled together, etc.). For example, the delivery conduit 226 may be formed from a single cylindrical pipe which is variously bent to form the delivery conduit 226. Due to this one-piece construction, the delivery conduit 226 may be less prone to leaks and failure than flexible conduits (e.g., braided pipes, etc.).

IV. Example Delivery Conduits

Figure 3:
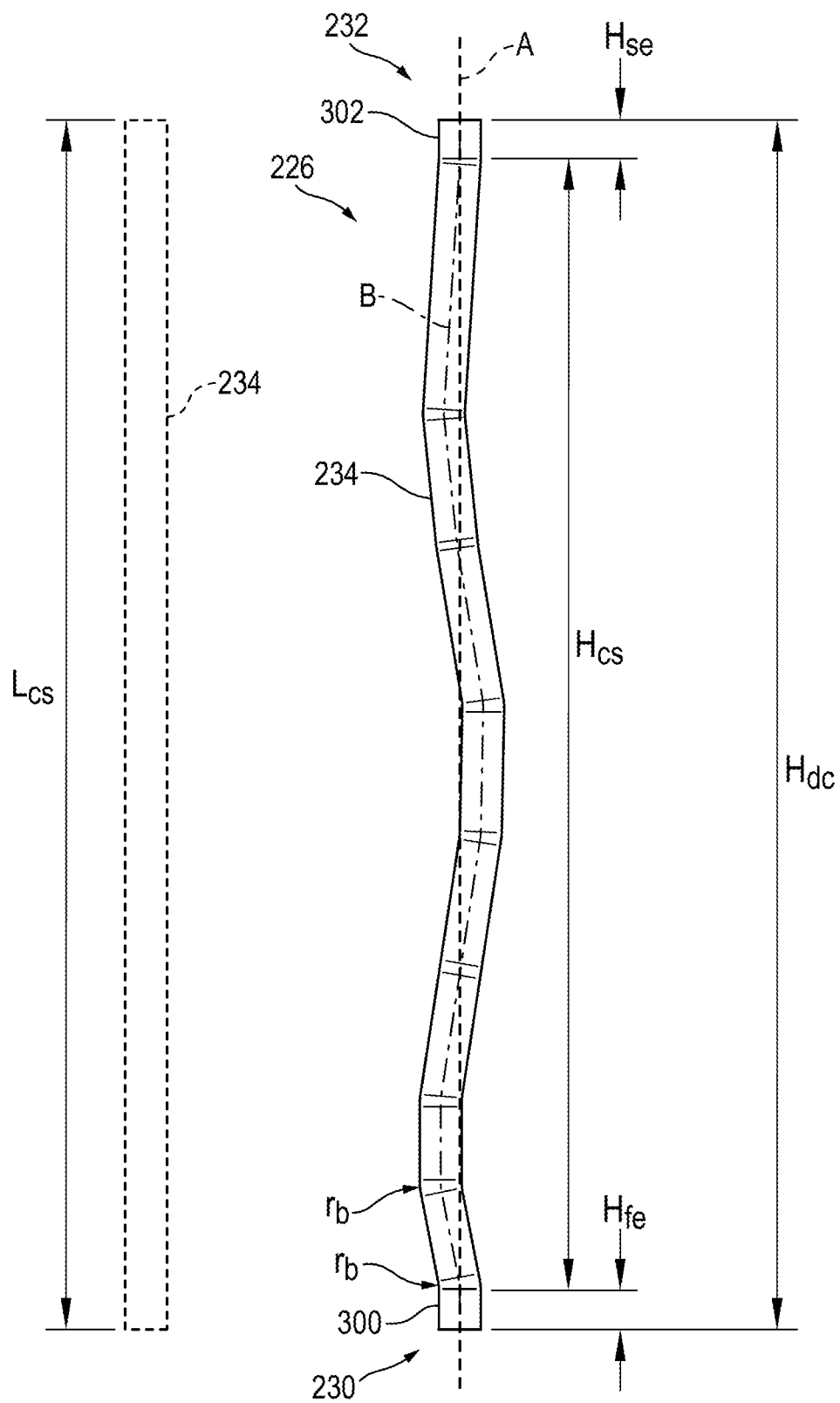
FIG. 3 is a side view of an example delivery conduit for use in a dosing lance assembly, such as the example dosing lance assembly shown in FIG. 2.
Figure 4:
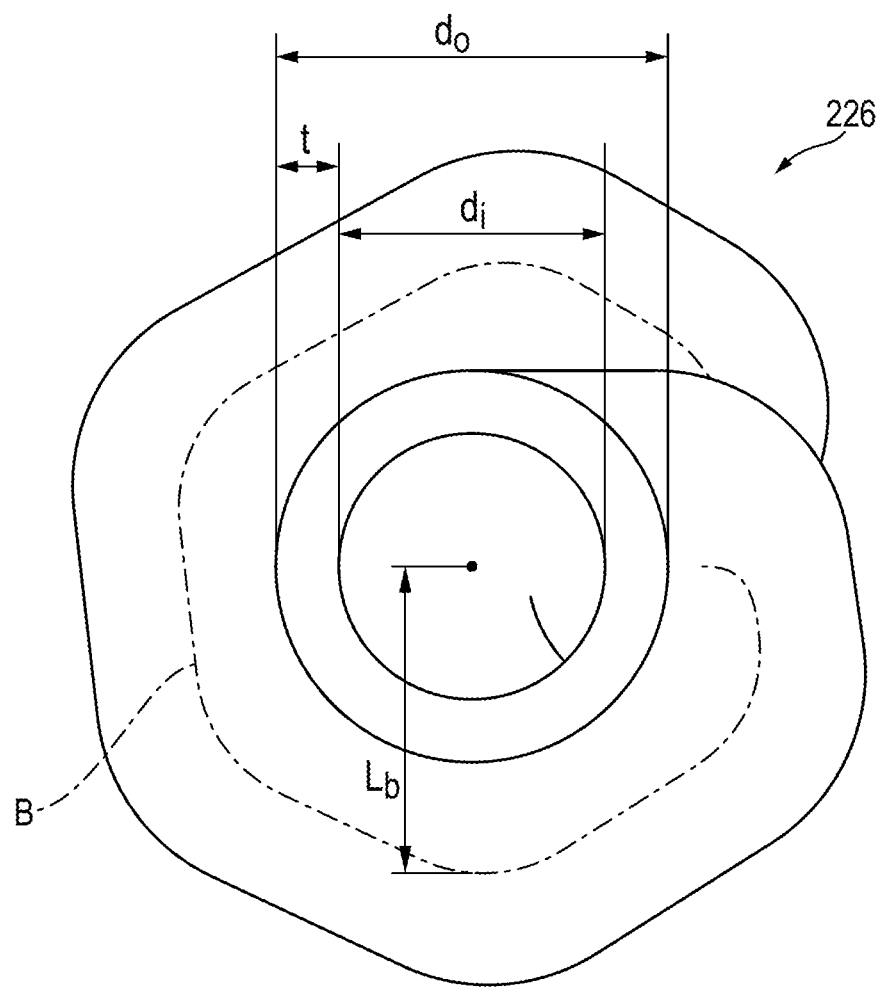
FIG. 4 is top view of the example delivery conduit shown in FIG. 3.

FIGS. 3 and 4 illustrate the delivery conduit 226 according to an example embodiment. The delivery conduit 226 is a hollow cylinder and has an outer diameter $d_o$ and an inner diameter $d_i$ defining a thickness t therebetween. The outer diameter $d_o$ of the delivery conduit 226 is substantially constant along the delivery conduit 226. In an example embodiment, the outer diameter $d_o$ of the delivery conduit 226 is 6.35 mm. The inner diameter $d_i$ of the delivery conduit 226 is substantially constant along the delivery conduit 226. In an example embodiment, the inner diameter $d_i$ of the delivery conduit 226 is 5.3975 mm. The thickness t of the delivery conduit 226 is substantially constant along the delivery conduit 226. In an example embodiment, the thickness t of the delivery conduit 226 is 0.9525 mm. In another embodiment, the thickness t of the delivery conduit 226 is 0.81 mm (e.g., 20 gauge, etc.).

The delivery conduit 226 has a height $H_{dc}$ between the first end 230 and the second end 232 along the channel central axis A of the second channel 214. In an example embodiment the height $H_{dc}$ of the delivery conduit 226 is 185.22 millimeters (mm). The delivery conduit 226 also has a height $H_{cs}$ of the center section 234 along the channel central axis A of the second channel 214. In an example embodiment, the height $H_{cs}$ of the delivery conduit 226 is 175.22 mm.

The delivery conduit 226 is defined by a conduit central axis B extending within the delivery conduit 226 along a center point of the delivery conduit 226. The delivery conduit 226 is also defined by a bend distance (e.g., circumference, etc.) $L_b$ from the conduit central axis B of the center section 234 from the channel central axis A of the second channel 214. In this way, the central axis B of the center section 234 is at least partially offset from (e.g., separated from, etc.) the channel central axis A of the second channel 214. The bend distance $L_b$ is substantially constant along the center section 234. In an example embodiment, the bend distance $L_b$ is 6.85 mm. As the center section 234 straightens, the bend distance $L_b$ decreases; as the center section 234 becomes increasingly helical, the bend distance $L_b$ increases.

The delivery conduit 226 is also defined by a plurality of bend radii $r_b$. In an example, each of the radii $r_b$ is equal to 9.5 mm. In various embodiments, each of the radii $r_b$ is equal to $1.5 d_o$. Such radii $r_b$ simplify manufacturing requirements (e.g., facilitate utilization of standard manufacturing equipment as opposed to customized manufacturing equipment, etc.) while facilitating desirable deformation of the center section 234 when the temperature of the housing 202 changes. To form the delivery conduit 226, the delivery conduit 226 may be bent using a computer numeric control (CNC) bender. Each of the radii $r_b$ may be input by a user into the CNC bender and the CNC bender may form a blank conduit into the delivery conduit 226.

The first end 230 includes a first substantially straight section 300 where the conduit central axis B is substantially coincident with the channel central axis A of the second channel 214. The first substantially straight section 300 of the first end 230 has a height $H_{fe}$. In an example embodiment, the height $H_{fe}$ of the first substantially straight section 300 of the first end 230 is 5 mm.

The second end 232 includes a second substantially straight section 302 where the conduit central axis B is substantially coincident with the channel central axis A of the second channel 214. The second substantially straight section 302 of the second end 232 has a height $H_{se}$. In an example embodiment, the height $H_{se}$ of the substantially straight section 302 of the second end 232 is 5 mm.

The delivery conduit 226 also has a helical length $L_{cs}$ along the conduit central axis B and therefore along the delivery conduit 226. The helical length $L_{cs}$ of the delivery conduit 226 is measured between a location at which the first end 230 is coupled to the plate 210 and a location at which the second end 232 is coupled to the endcap 222 (e.g., the fitting 228, the channel 229, etc.). The helical length $L_{cs}$ of the center section 234 is determined by $$L_{cs} = \sqrt{H_{cs}^2 + (2\pi L_b)^2} \quad (1)$$

In an example embodiment where the height $H_{cs}$ of the center section 234 is 175.22 mm and the bend distance $L_b$ is 6.85 mm, the helical length $L_{cs}$ of the delivery conduit 226 is $$L_{cs} = \sqrt{175.22\text{mm}^2 + (2\pi * 6.85\text{mm})^2} = 180.43 \text{ mm} \quad (2)$$

The housing 202 is defined by a height $H_h$ between a location at which a first end of the pipe 220 is coupled to the plate 210 and a location at which a second end of the pipe 220 is coupled to the endcap 222. The height $H_h$ of the housing 202 is a function of the temperature of the housing 202. In some embodiments, the height $H_h$ is equal to 175.22 mm when the housing 202 is at the ambient temperature $T_0$. The height $H_h$ is equal to the height $H_{cs}$ of the center section 234 when the entirety of the first substantially straight section 300 is received in the second channel 214 and the entirety of the second substantially straight section 302 is received in the fitting 228. Accordingly, the helical length $L_{cs}$ of the center section 234, which is measured between a location at which the first end 230 is coupled to the plate 210 and a location at which the second end 232 is coupled to the endcap 222 (e.g., the fitting 228, the channel 229, etc.), is greater than a distance, the height $H_h$, between a location at which a first end of the pipe 220 is coupled to the plate 210 and a location at which a second end of the pipe 220 is coupled to the endcap 222.

The delivery conduit 226 may have various different dimensions such that the delivery conduit 226 is tailored for a target application. In various embodiments, these different dimensions have a parametric relationship substantially identical to the parametric relationship present in the dimensions mentioned above.

TABLE 2

Dimensions associated with the dosing lance assembly 200 at the ambient temperature $T_0$.

| Dimension | Value of Dimension in an Example Embodiment [mm] | Parametric Relationship to $d_o$ | Value of Dimension in Various Embodiments [mm] |
|---|---|---|---|
| $d_o$ | 6.35 | $d_o$ | 1-20 |
| $H_h$ | 175.22 | $27.60 d_o$ | 27.60-552 |
| $H_{dc}$ | 185.22 | $29.17 d_o$ | 29.17-583.40 |
| $H_{cs}$ | 175.22 | $27.60 d_o$ | 27.60-552 |

TABLE 2-continued

Dimensions associated with the dosing lance assembly 200 at the ambient temperature $T_0$.

| Dimension | Value of Dimension in an Example Embodiment [mm] | Parametric Relationship to $d_o$ | Value of Dimension in Various Embodiments [mm] |
|---|---|---|---|
| $d_i$ | 5.3975 | $0.85 d_o$ | 0.85-17 |
| t | 0.9525 | $0.15 d_o$ | 0.15-3 |
| $L_b$ | 6.85 | $1.08 d_o$ | 1.08-21.6 |
| $r_b$ | 9.5 | $1.5 d_o$ | 1.5-30 |
| $H_{fe}$ | 5 | $0.79 d_o$ | 0.79-15.8 |
| $H_{se}$ | 5 | $0.79 d_o$ | 0.79-15.8 |
| $H_{cs}$ | 180.43 | $28.41 d_o$ | 28.41-568.2 |

As the housing 202 is heated (e.g., by exhaust gases within the exhaust component 206, etc.), the housing 202 may deform. For example, each of the housing 202, the pipe 220, the endcap 222, and/or the nozzle 224 may be displaced relative to the others of the housing 202, the pipe 220, the endcap 222, and/or the nozzle 224 when the housing 202 is heated. This displacement results in a change in the height $H_h$ of the housing 202. The height $H_h$ of the housing 202 is a function of the temperature $T_h$ of the housing 202.

The change in the height $H_h$ of the housing 202 is determined by $$\Delta H_h = \alpha_h \Delta T_h H_h \quad (3)$$

where $\Delta T_h$ is the change in temperature of the housing 202 from an ambient temperature of the housing 202 (e.g., an average ambient temperature of various components of the housing 202, etc.) associated with an ambient environment surrounding the dosing lance assembly 200 to a current temperature of the housing 202, and where $\alpha_h$ is the coefficient of thermal expansion of the housing 202 (e.g., an average coefficient of thermal expansion of various components of the housing 202, etc.). The change in the height $H_h$ of the housing 202 may be determined when, for example, the internal combustion engine is warming up, at steady-state, or cooling down. The change in the height $H_h$ of the housing 202 increases as the temperature of the housing 202 increases. Accordingly, the change in the height $H_h$ of the housing 202 is greater when the internal combustion engine is at steady-state than when the internal combustion engine is warming up or cooling down.

In one embodiment, the housing 202, the pipe 220, the endcap 222, and the nozzle 224 are made from 439 stainless steel, such that $\alpha_h$ is $$11 \frac{\mu m}{mK}.$$

In this embodiment, the height $H_h$ of the housing 202 is 175.22 mm and the average $\Delta T_h$ is 555° K (e.g., from −55° C. to 500° C., etc.). Therefore, the change in the height $H_h$ of the housing 202 is:

$$\Delta H_h = 11 \frac{\mu m}{mK} * 555° K. * 175.22 \text{ mm} * \frac{0.001 \text{ mm}}{1 \mu m} \quad (4)$$

$$= 1069.718 \frac{mm^2}{m} * \frac{1 m}{1000 mm}$$

$$= 1.07 \text{ mm}$$

when the internal combustion engine is at steady-state. In this embodiment, the plate 210 and the fitting 228 are 1.07 mm further apart when the housing 202 is at the steady-state temperature $T_{SS}$ than when the housing 202 is at the ambient temperature $T_0$.

As the height $H_h$ of the housing 202 changes, the center section 234 is stretched and/or compressed. In this way, the height $H_{cs}$ of the center section 234 is a function of the height $H_h$ of the housing 202. For example, as the height $H_h$ increases (e.g., as the plate 210 is separated further from the fitting 228, etc.), the plate 210 pulls on the first end 230 of the delivery conduit 226 and the fitting 228 pulls on the second end 232 of the delivery conduit 226, thereby causing a corresponding increase in the height $H_{cs}$ of the center section 234. Stretching of the center section 234 is facilitated by the helical shape of the center section 234 because as the height $H_{cs}$ of the center section 234 increases, the center section 234 straightens. Similarly, compression of the center section 234 is facilitated by the helical shape of the center section 234 because as the height $H_{cs}$ of the center section 234 decreases, the center section 234 becomes increasingly helical in shape. The height $H_{cs}$ of the center section 234 varies between $$H_h(T_0) \le H_{cs} \le L_{cs} \quad (5)$$

where $H_h(T_0)$ is the height of the housing 202 when the housing 202 is at the ambient temperature $T_0$. The center section 234 is configured to have a helical length $L_{cs}$ that is equal to the height of the housing 202 when the housing 202 is at the steady-state temperature $T_{SS}$. Therefore the helical length $L_{cs}$ of the center section 234 is a function of the height $H_h$ at the ambient temperature $T_0$, the change in temperature of the housing 202 $\Delta T_h$ from the ambient temperature $T_0$ to the steady state current temperature of the housing 202, and the coefficient of thermal expansion of the housing 202 $\alpha_h$. In various embodiments, a first location on the conduit central axis B is a first distance from a second location on the channel central axis A when the housing 202 is at the ambient temperature $T_0$. In these embodiments, the first location on the conduit central axis B is a second distance, less than the first distance, from the second location on the channel central axis A when the housing 202 is at temperatures greater than the ambient temperature $T_0$.

Depending on the change in the height $H_h$ of the housing 202 from the ambient temperature $T_0$ to the steady-state temperature $T_{SS}$ the center section 234 may need to facilitate more or less stretching and compression. For example, if the change in the height $H_h$ of the housing 202 from the ambient temperature $T_0$ to the steady-state temperature $T_{SS}$ is relatively large, the center section 234 must facilitate a relatively large amount of stretching and compression. Accordingly, the height $H_{cs}$ of the center section 234 and the bend distance $L_b$ are functions of the change in the height $H_h$ of the housing 202 from the ambient temperature $T_0$ to the steady-state temperature $T_{SS}$. As the change in the height $H_h$ of the housing 202 from the ambient temperature $T_0$ to the steady-state temperature $T_{SS}$ increases, the height $H_{cs}$ of the center section 234 and/or the bend distance $L_b$ correspondingly increase.

As the housing 202 is heated by exhaust gases within the exhaust component 206, the delivery conduit 226 is also heated. The housing 202 is structured to attain a maximum temperature $T_{Max}$ when exhaust gases are provided through the exhaust component 206. The maximum temperature $T_{Max}$ is greater than the ambient temperature $T_0$. The helical length $L_{cs}$ of the center section 234 is determined by a function of the height $H_h$ at the ambient temperature $T_0$, the change in temperature of the housing 202 $\Delta T_h$ from the ambient temperature $T_0$ to the maximum temperature $T_{Max}$, and the coefficient of thermal expansion of the housing 202 $\alpha_h$. The helical shape of the center section 234 is utilized because reductant flows through the delivery conduit 226, thereby cooling the center section 234 relative to the housing 202. The temperature of the delivery conduit 226 is less than the temperature of the housing 202 when the internal combustion engine is warming up, cooling down, and at steady state because of the cooling provided by the reductant.

The plate 210 is also structured to provide air into the pipe 220 such that the housing 202 and the delivery conduit 226 are cooled by the air. This air may be provided through the first channel 212. This air may, for example, flow within the housing 202 thereby cooling an internal surface of the housing 202 while simultaneously cooling an external surface of the delivery conduit 226. This cooling of the housing 202 functions to decrease the change in the height $H_h$ of the housing 202 from the ambient temperature $T_0$ to the steady-state temperature $T_{SS}$, thereby reducing the height $H_{cs}$ and/or the bend distance $L_b$ of the center section 234 because a smaller helical length $L_{cs}$ of the center section 234 can be utilized.

Figure 5:
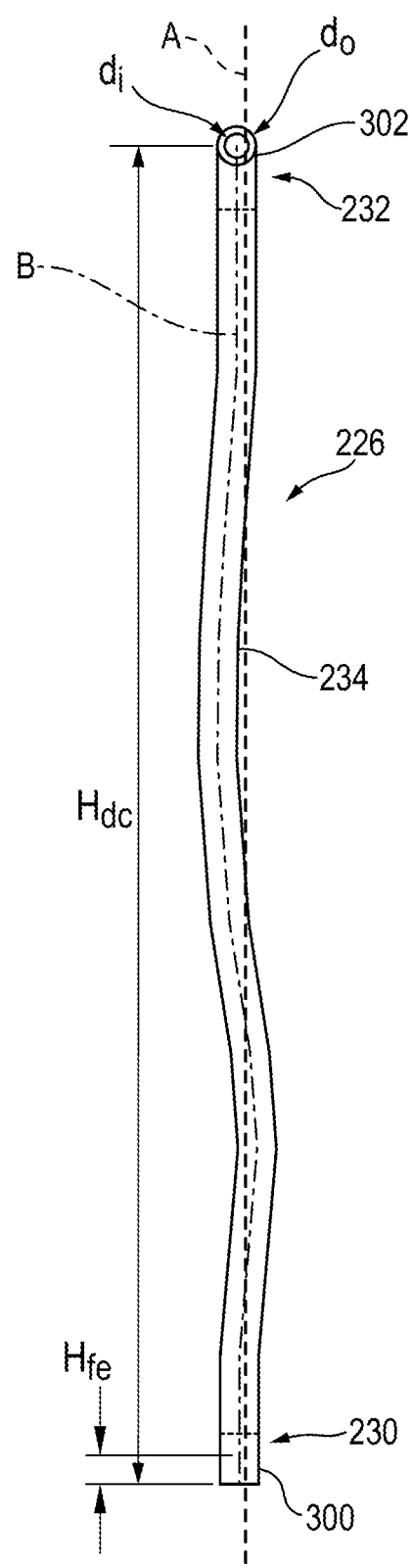
FIG. 5 is a side view of another example delivery conduit for use in a dosing lance assembly, such as the example dosing lance assembly shown in FIG. 2.
Figure 6:
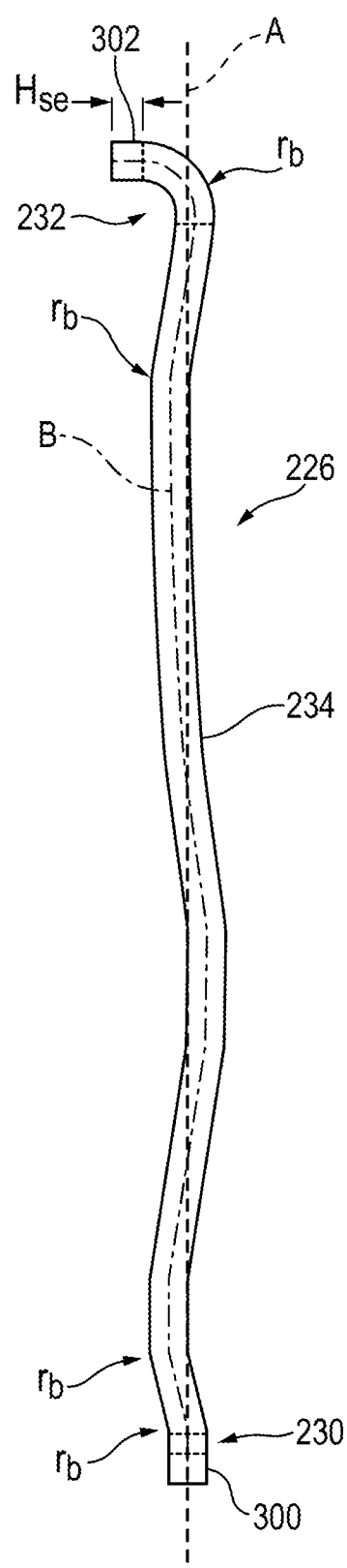
FIG. 6 is rear view of the example delivery conduit shown in FIG. 5.
Figure 7:
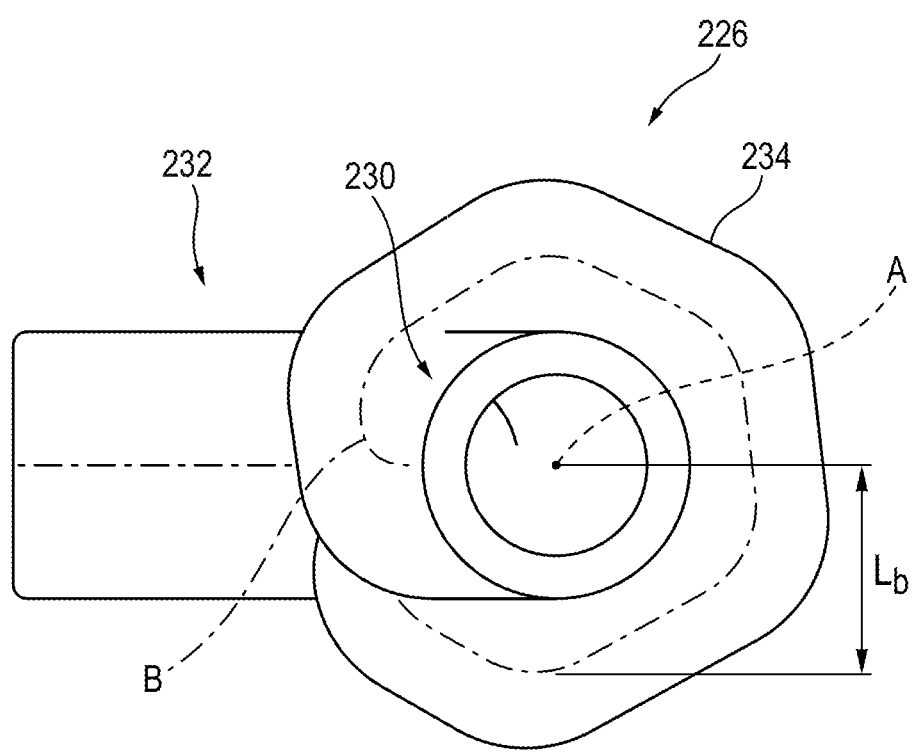
FIG. 7 is bottom view of the example delivery conduit shown in FIG. 5.

FIGS. 5-7 illustrate the delivery conduit 226 according to another example embodiment. In this embodiment, the height $H_{dc}$ of the delivery conduit 226 is 174.22 mm. The second end 232 is bent such that the second substantially straight section 302 is generally orthogonal to the conduit central axis B. The delivery conduit 226 of this embodiment may be implemented with a fitting 228 having a different configuration that that shown in FIG. 2.

Figure 8:
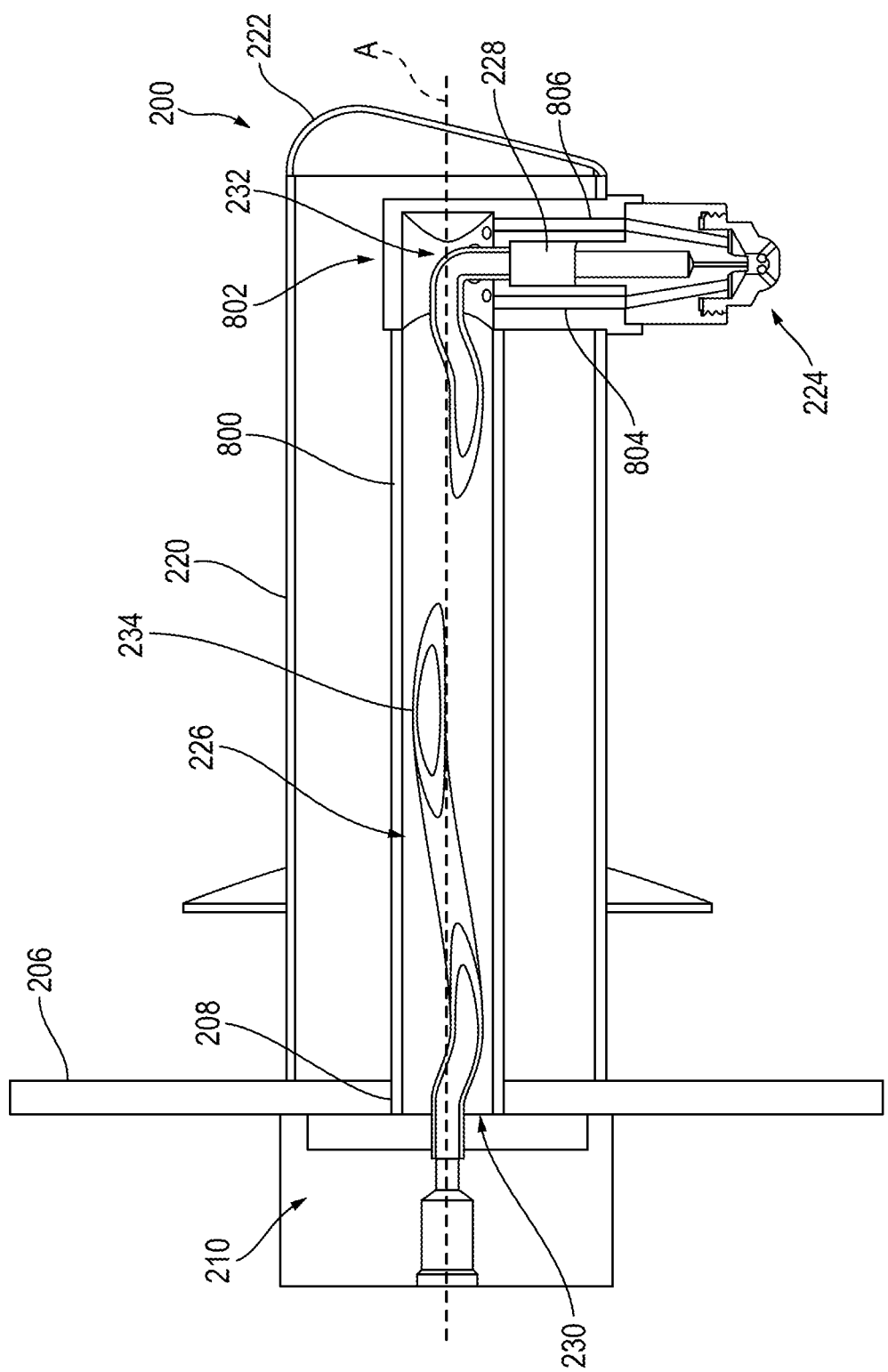
FIG. 8 is a cross-sectional view of another example dosing lance assembly for use in an aftertreatment system, such as the example aftertreatment system shown in FIG. 1.
Figure 9:
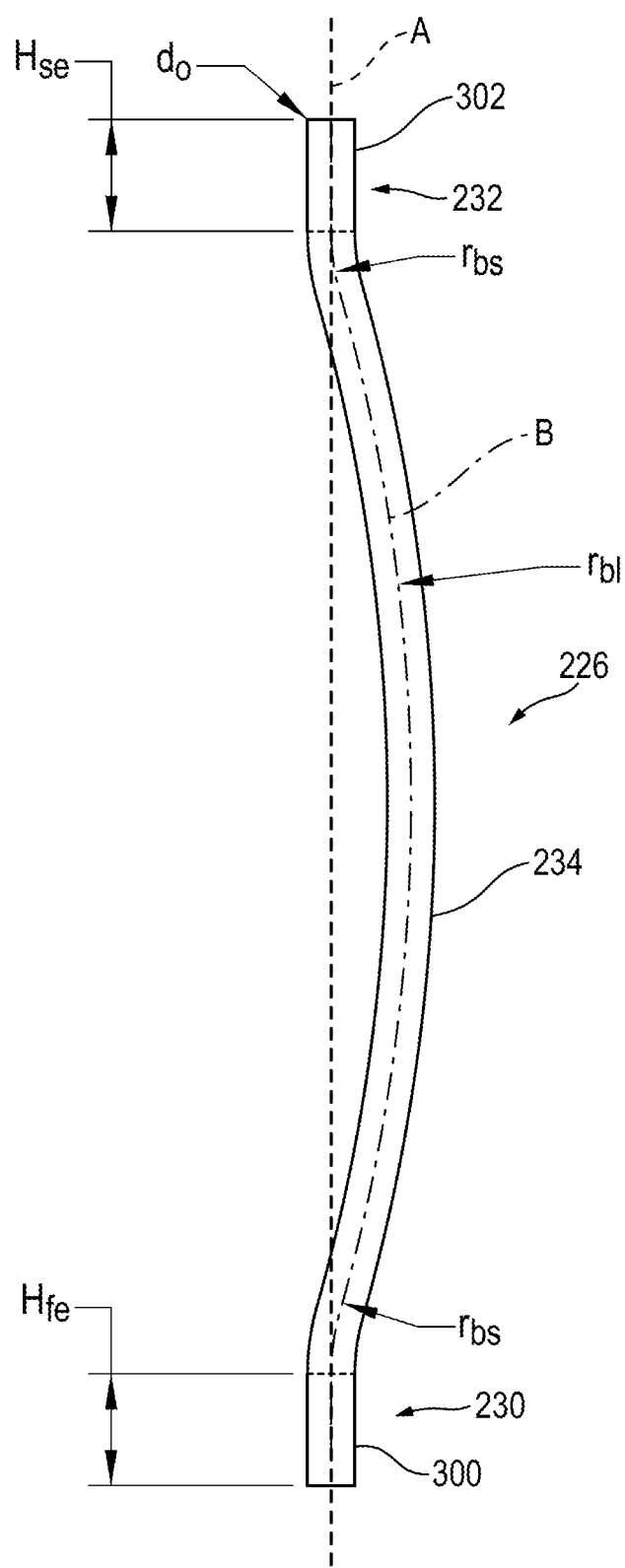
FIG. 9 is a side view of another example delivery conduit for use in a dosing lance assembly, such as the example dosing lance assembly shown in FIG. 2.
Figure 10:
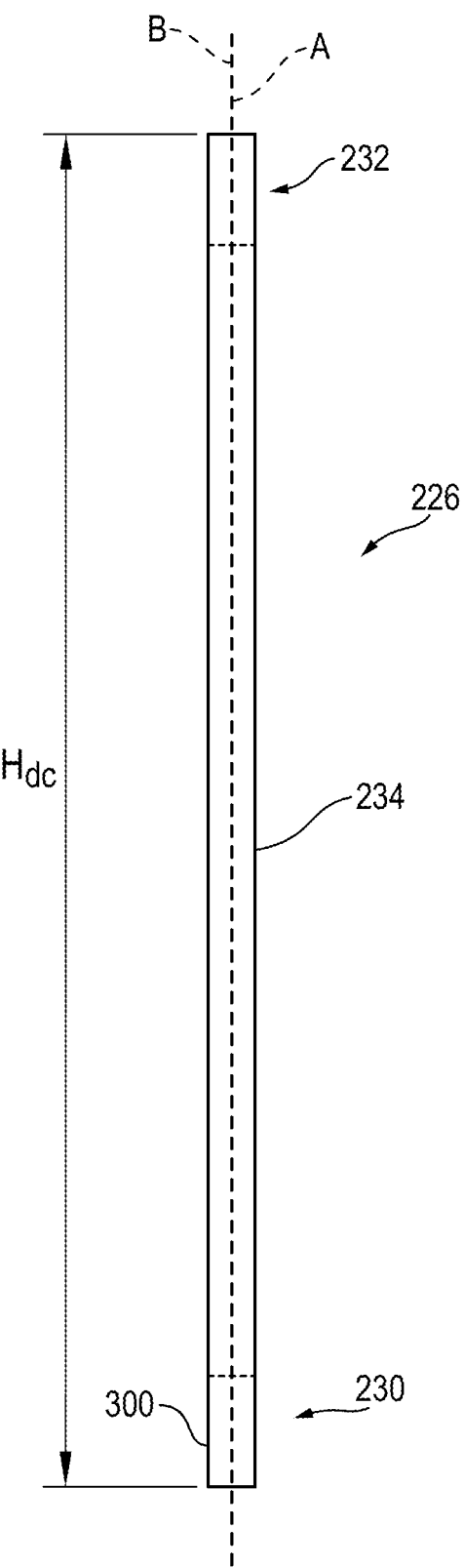
FIG. 10 is rear view of the example delivery conduit shown in FIG. 9.
Figure 11:
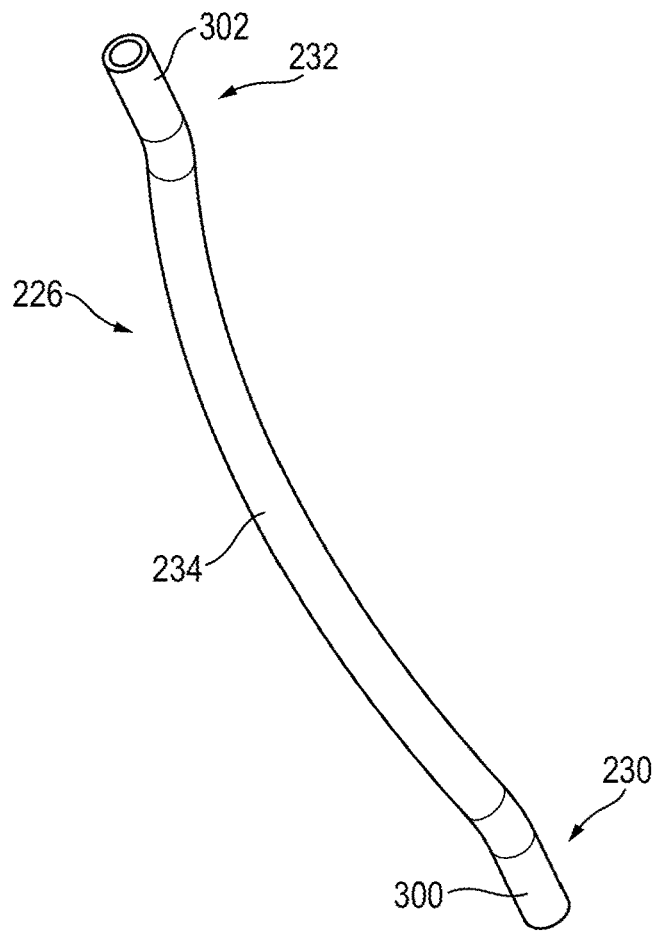
FIG. 11 is a perspective view of the example delivery conduit shown in FIG. 9.
Figure 12:
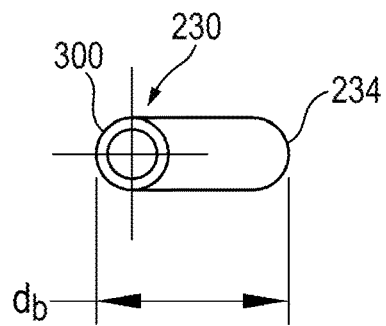
FIG. 12 is bottom view of the example delivery conduit shown in FIG. 9.

FIG. 8 illustrates the dosing lance assembly 200 according to another example embodiment. In this embodiment, the dosing lance assembly 200 utilizes the delivery conduit 226 as shown in FIGS. 5-7. The dosing lance assembly 200 includes an air conduit 800 coupled to the exhaust component 206 about the aperture 208. The air conduit 800 is coupled to elbow 802 which protrudes through the pipe 220 and is coupled to the nozzle 224. The air conduit 800 receives air (e.g., from the first connector 216, etc.) and routes the air within the pipe 220 around the delivery conduit 226. The air conduit 800 is configured based on the delivery conduit 226 such that space between the delivery conduit 226 and the air conduit 800 is minimized. For example, the air conduit 800 may be a cylinder with an inner radius slightly larger than the bend distance $L_b$ of the delivery conduit 226. By routing the air with close proximity around the delivery conduit 226, cooling of the delivery conduit 226 is maximized. The air conduit 800 may be coupled to the nozzle 224 such that the air is provided into the nozzle 224. The endcap 222 may be coupled to the pipe 210 via brazed joints. Similarly, the pipe 210 may be coupled to the plate 210 using brazed joints.

As also shown in FIG. 8, the elbow 802 includes a first air passageway 804 and a second air passageway 806. The first air passageway 804 and the second air passageway 806 receive air from the air conduit 800 and provide the air through the elbow 802 to the nozzle 224. The first air passageway 804 and the second air passageway 806 may function to mix the air and the reductant in the nozzle 224. The nozzle 224 may seal to the elbow 802 via a Grafoil® seal (e.g., gasket, O-ring, etc.). Similarly, the plate 210 may be configured to be attached to the exhaust component 206 via a bolted joint.

FIGS. 9-12 illustrate the delivery conduit 226 according to another example embodiment. In these embodiments, the delivery conduit 226 is bent in a single plane rather than a helix. By being bent only a single time, the delivery conduit 226 may experience less thermal stress on end welds (e.g., connections between the delivery conduit 226 and the plate 210, connections between the delivery conduit 226 and the endcap 222, etc.) than if the delivery conduit 226 was not bent at all. The arrangement of the delivery conduit 226 may minimize costs because only a relatively simple bending operation is required. In these embodiments, the height $H_{se}$ of the second substantially straight section 302 of the second end 232 may be, for example, 15 mm, the outer diameter $d_o$ of the delivery conduit 226 may be, for example, 6.35 mm, the height $H_{fe}$ of the first substantially straight section 300 of the first end 230 may be, for example, 15 mm, and the height $H_{dc}$ of the delivery conduit 226 may be, for example, 183.37 mm. Furthermore, the delivery conduit 226 is defined by a small bend radius $r_{bs}$ at the junction of the center section 234 and each of the first end 230 and the second end 232 and a large bend radius $r_{bl}$ at a midpoint of the center section 234. In various embodiments, the small bend radius $r_{bs}$ is 30 mm and the large bend radius $r_{bl}$ is 250 mm. The delivery conduit 226 is also defined by a maximum bend distance $d_b$ from an outermost edge of the first substantially straight section 300 to an outermost edge of the center section 234. In various embodiments, the maximum bend distance $d_b$ is 17.1 mm. In one embodiment, the thickness t of the delivery conduit 226 is 0.81 mm (e.g., 20 gauge, etc.).

Figure 13:
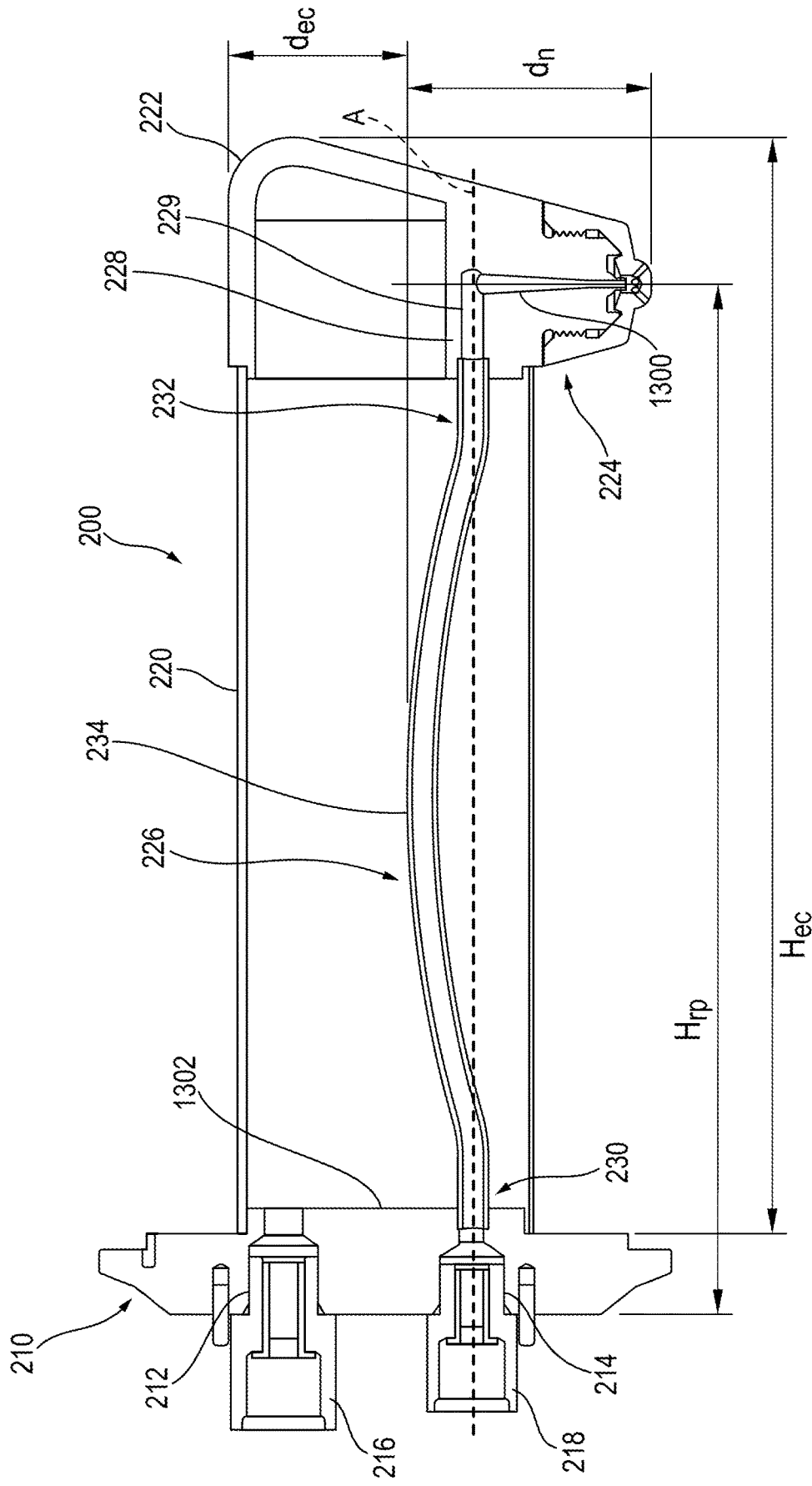
FIG. 13 is a cross-sectional view of another example dosing lance assembly for use in an aftertreatment system, such as the example aftertreatment system shown in FIG. 1.
Figure 14:
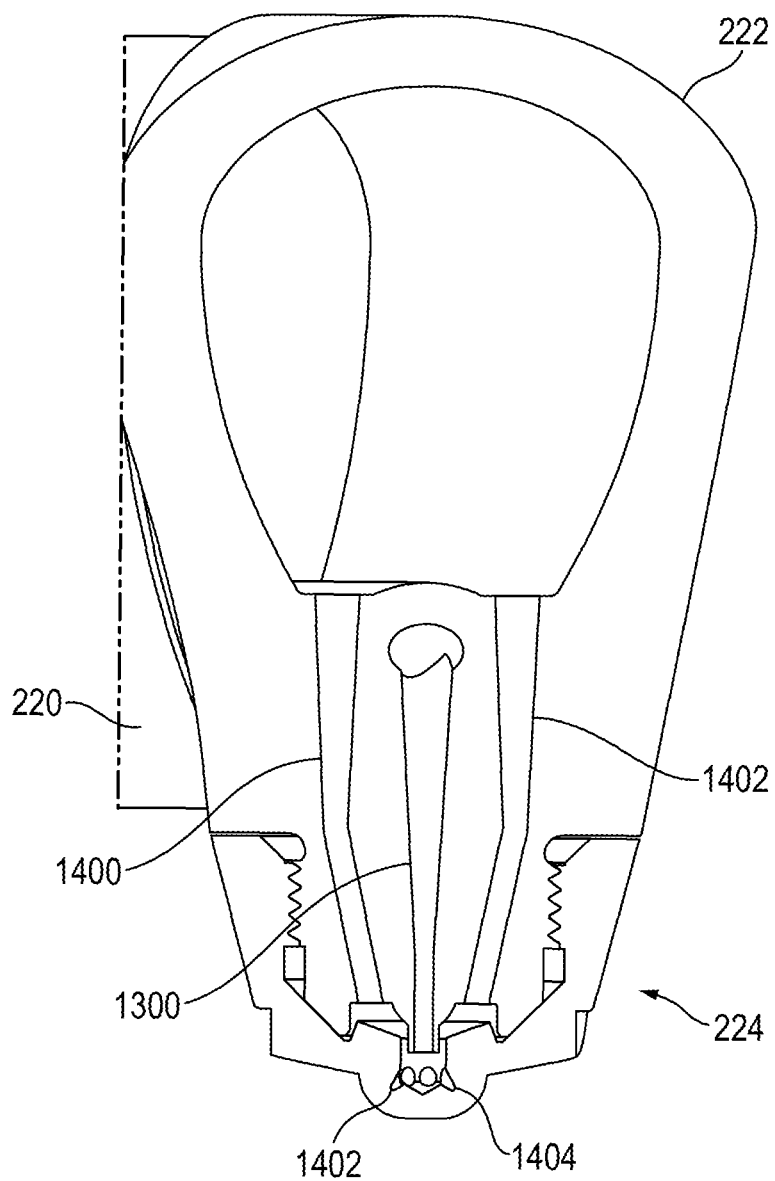
FIG. 14 is a cross-sectional view of the dosing lance assembly shown in FIG. 13.
Figure 15:
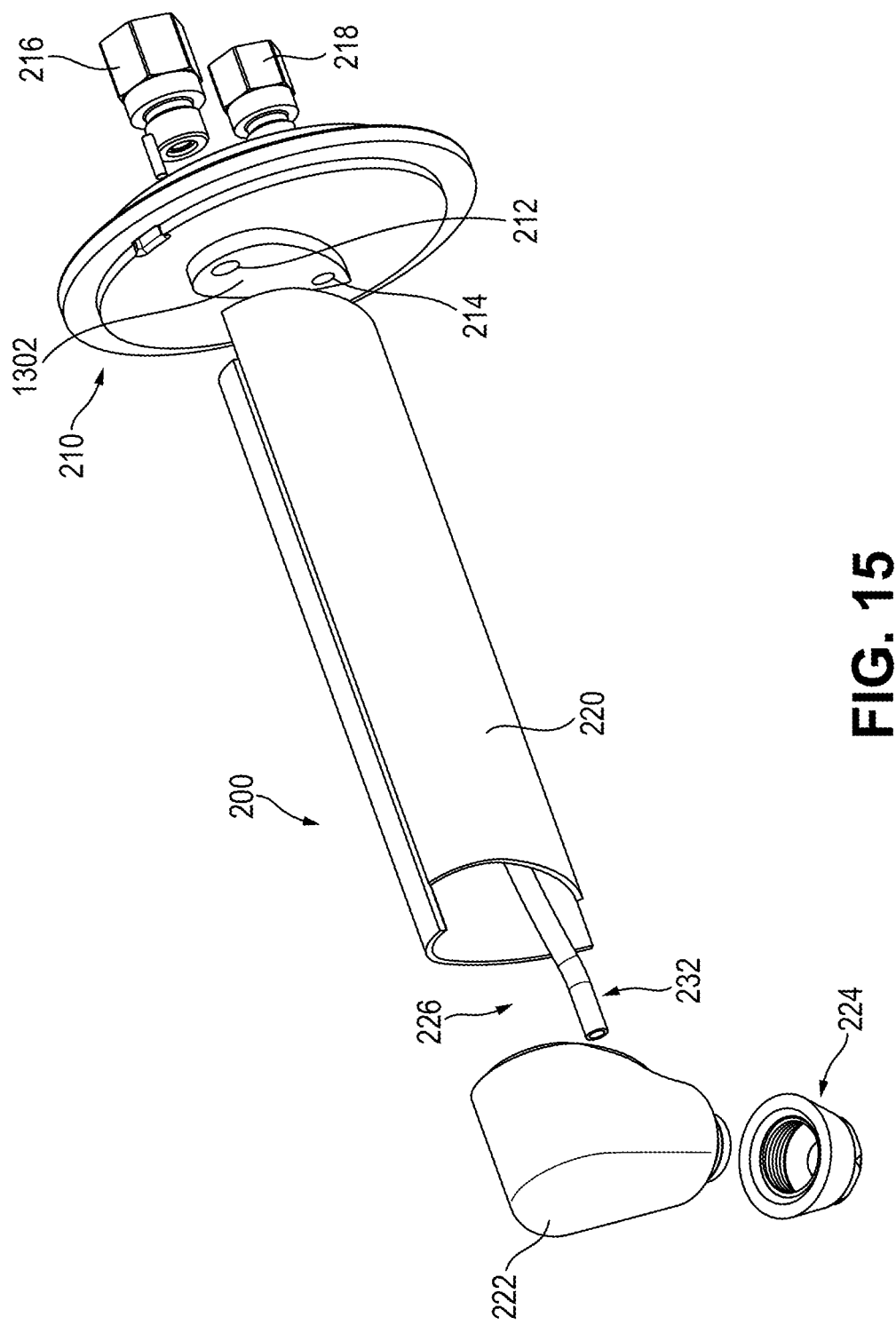
FIG. 15 is an exploded view of the dosing lance assembly shown in FIG. 13.

FIGS. 13-15 illustrate the dosing lance assembly 200 according to another example embodiment. In this embodiment, the dosing lance assembly 200 utilizes the delivery conduit 226 as shown in FIGS. 9-12. The dosing lance assembly 200 does not include an air conduit similar to the air conduit 800. The endcap 222 includes a threaded protrusion and the nozzle 224 is configured to be threaded onto the threaded protrusion. The threads may cover 6.8 mm on the endcap 222 and 6.8 mm on the nozzle 224. In this way, the nozzle 224 may be sealed to the endcap 222 using a metal-to-metal seal (e.g., a 45 degree seal, etc.). In these embodiments, the endcap 222 includes a reductant passageway 1300 which receives the reductant from the channel 229 and provides the reductant to the nozzle 224.

In the embodiments shown in FIGS. 13-15, the endcap 222 also includes a first air passageway 1400 and a second air passageway 1402. The first air passageway 1400 and the second air passageway 1402 receive air from the pipe 220 and provide the air through the endcap 222 to the nozzle 224. The air in the pipe 220 is pressurized. In various embodiments, the air in the pipe 220 is at approximately 45 pounds per square inch (PSI). The nozzle 224 has a 90 degree nozzle angle or a 70 degree nozzle angle. The nozzle 224 includes a plurality of holes (e.g., apertures, etc.) 1404 from which an air-reductant mixture is provided from the dosing lance assembly 200. In various embodiments, the nozzle 224 includes six holes 1404. The holes 1404 are symmetrically disposed about the nozzle 224 (e.g., at 60 degree increments about the nozzle 224, etc.). The configuration of the first air passageway 1400, the second air passageway 1402, the reductant passageway 1300, and the six holes 1404 creates an air curtain within the nozzle 224 which substantially prevents reductant from entering the air circuit of the dosing lance assembly 200 (e.g., entering the pipe 220 outside of the delivery conduit 226, etc.).

In the embodiments shown in FIGS. 13-15, the plate 210 includes a protrusion 1302 which is configured to be received in the pipe 220. The interaction between the protrusion 1302 and the pipe 220 is configured to arrest rotation of the pipe 220 relative to the plate 210, and therefore relative to the exhaust component 206. In this way, the protrusion 1302 may be a poka-yoke feature (e.g., an error-proof feature, etc.) for the dosing lance assembly 200. In various embodiments, the pipe 220 and the protrusion 1302 are airfoil shaped (e.g., teardrop shaped, etc.). For example, the pipe 220 and the protrusion 1302 may each by shaped as a symmetric airfoil, a cambered airfoil, and/or shaped according to National Advisory Committee for Aeronautics (NACA) standards (e.g., NACA 2142, NACA 0015, NACA 0012, etc.). The airfoil shape of the pipe 220 may reduce boundary layer separation of exhaust gases encountering the pipe 220 (e.g., within the exhaust component 206, etc.). As a result, the airfoil shape of the pipe 226 may facilitate less recirculation of the exhaust gases near the nozzle 224, and therefore more desirable delivery of the reductant to the exhaust gases, than if the pipe 226 were not airfoil shaped.

The plate 210 may be configured to be attached to the exhaust component 206 via cooperation of a Marmon joint (e.g., a half Marmon joint, etc.) on the plate 210 and a V-band clamp. In this way, the dosing lance assembly 200 shown in FIGS. 13-15 may be rapidly serviced. The endcap 222 may be coupled to the pipe 210 using tungsten inert gas (TIG) welds. Similarly, the pipe 210 may be coupled to the plate 210 using TIG welds.

In various embodiments, the endcap 222 is constructed from 316L stainless steel, the nozzle 224 is constructed from Nitronic 60 alloy, the delivery conduit 226 is constructed from 316L stainless steel, the pipe 220 is constructed from 439 stainless steel, and the plate 210 is constructed from 316L stainless steel. The dosing lance assembly 200 may weigh, for example, 2.26796 kilograms (e.g., five pounds, etc.).

In the embodiments shown in FIGS. 13-15, the dosing lance assembly 200 is defined by a height $H_{rp}$ from an exterior face of the plate 210 to a center axis of the reductant passageway 1300 and a height $H_{ec}$ from an interior face of the plate 210 to a distal point (e.g., outermost point, etc.) of the end cap 222. In various embodiments, the height $H_{rp}$ is between 217.4 mm and 218.4 mm, inclusive and the height $H_{ec}$ is 231.4 mm. Similarly, the dosing lance assembly 200 is defined by a distance $d_o$ from the outermost edge of the center section 234 to the outermost edge of the nozzle 224 and a distance den from the outermost edge of the center section 234 to the outermost edge of the endcap 222. In various embodiments, the distance $d_o$ is 56.1 mm and the distance den is 33.51 mm.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, the term "helical" is intended to have a definition in harmony with that used in the art of geometric design. The term "helical" may refer to a cylindrical shape that is wrapped around another cylinder or cone. The term "helical" may refer to a shape in the form of a helix (e.g., single helix, double helix, etc.) or spiral. The term "helical" is not limited to a perfect helix and encompasses at least $d_i$ minimus variations therefrom.

The terms "coupled," "attached," "fastened," "fixed," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "fluidly communicable with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

What is claimed is:

1. A dosing lance assembly for an exhaust component, the dosing lance assembly comprising:
    a housing comprising:
        a plate having a first channel,
        an endcap having a second channel, and
        a pipe having a first end coupled to the plate and a second end coupled to the endcap, wherein an inner surface of the pipe and an outer surface of the pipe are airfoil-shaped; and
    a delivery conduit having a first end coupled to the plate and a second end coupled to the endcap, such that reductant is flowable from the first channel to the second channel;

wherein, when the housing is at an ambient temperature,
(i) a length of the delivery conduit measured along the delivery conduit between a location at which the first end of the delivery conduit is coupled to the plate and a location at which the second end of the delivery conduit is coupled to the endcap is greater than (ii) a first distance between a location at which the first end of the pipe is coupled to the plate and a location at which the second end of the pipe is coupled to the endcap.

2. The dosing lance assembly of claim 1, wherein the plate comprises a protrusion that is positioned within the first end.

3. The dosing lance assembly of claim 2, wherein at least a portion of the protrusion is airfoil-shaped.

4. The dosing lance assembly of claim 1, wherein the endcap extends orthogonally to the pipe.

5. The dosing lance assembly of claim 1, wherein at least a portion of a conduit central axis of the delivery conduit is offset from a channel central axis of the first channel.

6. The dosing lance assembly of claim 1, wherein at least a portion of the delivery conduit comprises a single bend, multiple bends, or a single helix.

7. The dosing lance assembly of claim 1, wherein the delivery conduit is substantially rigid.

8. The dosing lance assembly of claim 1, wherein the delivery conduit is a one-piece construction.

9. The dosing lance assembly of claim 1, wherein:
the delivery conduit comprises a center section contiguous with the first end of the delivery conduit and the second end of the delivery conduit;
the center section is centered on a conduit central axis;
the first channel is centered on a channel central axis;
a first location on the conduit central axis is a second distance from a second location on the channel central axis when the housing is at the ambient temperature; and
the first location on the conduit central axis is a third distance from the second location on the channel central axis when the housing is at temperatures greater than the ambient temperature; and
the third distance is less than the second distance.

10. The dosing lance assembly of claim 1, wherein:
the delivery conduit comprises a center section contiguous with the first end of the delivery conduit and the second end of the delivery conduit;
the center section is defined by a bend radius;
the delivery conduit is defined by an outer diameter; and
the bend radius is approximately equal to one and a half times the outer diameter when the housing is at the ambient temperature.

11. The dosing lance assembly of claim 1, wherein the pipe is constructed from a ferritic steel and the delivery conduit is constructed from an austenitic steel.

12. The dosing lance assembly of claim 1, wherein:
the delivery conduit comprises a center section contiguous with the first end of the delivery conduit and the second end of the delivery conduit; and
the plate is structured to provide air into the pipe such that the air is provided around the center section and the center section is cooled by the air.

13. The dosing lance assembly of claim 1, wherein:
the delivery conduit comprises a center section contiguous with the first end of the delivery conduit and the second end of the delivery conduit;
the housing is defined by a coefficient of thermal expansion;
the housing is structured to attain a maximum temperature when exhaust gases are provided through the exhaust component, the maximum temperature greater than the ambient temperature; and
the length of the center section is determined by a function of the coefficient of thermal expansion, the maximum temperature, and the first distance.

14. The dosing lance assembly of claim 1, wherein:
the delivery conduit comprises a center section contiguous with the first end of the delivery conduit and the second end of the delivery conduit;
the center section is centered on a conduit central axis;
the first channel is centered on a channel central axis; and
the conduit central axis is rotatably disposed about the channel central axis.

15. The dosing lance assembly of claim 1, wherein:
the delivery conduit comprises a center section contiguous with the first end of the delivery conduit and the second end of the delivery conduit;
the first channel is centered on a channel central axis;
the center section has a second distance measured along the channel central axis between the location at which the first end of the delivery conduit is coupled to the plate and the location at which the second end of the delivery conduit is coupled to the endcap when the housing is at the ambient temperature; and
the center section has a third distance measured along the channel central axis between the location at which the first end of the delivery conduit is coupled to the plate and the location at which the second end of the delivery conduit is coupled to the endcap when the housing is at temperatures greater than the ambient temperature, the third distance being greater than the second distance.

16. The dosing lance assembly of claim 15, wherein:
the delivery conduit comprises a center section contiguous with the first end of the delivery conduit and the second end of the delivery conduit;
the center section is defined by a bend radius;
the delivery conduit is defined by an outer diameter; and
the bend radius is greater than the outer diameter when the housing is at the ambient temperature.

17. The dosing lance assembly of claim 15, wherein at least a portion of the center section is disposed along a conduit central axis separated from the channel central axis.

18. The dosing lance assembly of claim 17, wherein:
the center section comprises a single bend;
a first location on the conduit central axis is a fourth distance from a second location on the channel central axis when the housing is at the ambient temperature;
the first location on the conduit central axis is a fifth distance from the second location on the channel central axis when the housing is at temperatures greater than the ambient temperature;
the fifth distance is less than the fourth distance; and
the first location is located on the single bend.

19. The dosing lance assembly of claim 17, wherein:
the center section comprises multiple bends;
a first location on the conduit central axis is a fourth distance from a second location on the channel central axis when the housing is at the ambient temperature;
the first location on the conduit central axis is a fifth distance from the second location on the channel central axis when the housing is at temperatures greater than the ambient temperature;
the fifth distance is less than the fourth distance; and
the first location is located on at least one bend of the multiple bends.

20. The dosing lance assembly of claim 17, wherein:
the center section comprises a single helix;
a first location on the conduit central axis is a fourth distance from a second location on the channel central axis when the housing is at the ambient temperature;
the first location on the conduit central axis is a fifth distance from the second location on the channel central axis when the housing is at temperatures greater than the ambient temperature;
the fifth distance is less than the fourth distance; and
the first location is located on the single helix.

21. The dosing lance assembly of claim 15, wherein:
the center section is centered on a conduit central axis;
the center section comprises a single bend, multiple bends, or a single helix; and
the conduit central axis is offset from the channel central axis.

22. The dosing lance assembly of claim 15, wherein:
the center section is defined by a bend radius;
the delivery conduit is defined by an outer diameter; and
the bend radius is greater than the outer diameter when the housing is at the ambient temperature.

23. The dosing lance assembly of claim 1, further comprising
an air conduit;
wherein the housing further comprises an elbow coupled to the pipe;
wherein the delivery conduit extends within the air conduit and is coupled to the elbow; and
wherein the air conduit comprises a first air conduit end and a second air conduit end coupled to the elbow, the air conduit separated from the pipe at a location between the plate and the endcap.

24. The dosing lance assembly of claim 23, wherein the housing further comprises a nozzle that is coupled to the elbow and projects orthogonally from the pipe, the nozzle configured to:
separately receive air from the air conduit and the reductant from the delivery conduit;
mix the air and the reductant into an air-reductant mixture; and
provide the air-reductant mixture.

* * * * *